United States Patent
Williams

[11] Patent Number: 5,945,060
[45] Date of Patent: Aug. 31, 1999

[54] METHOD OF MAKING LATEX-FREE ELASTIC EXERCISE BANDS

[75] Inventor: Colin David Williams, Signal Mountain, Tenn.

[73] Assignee: Magister Corporation, Chattanooga, Tenn.

[21] Appl. No.: 08/905,086

[22] Filed: Aug. 1, 1997

[51] Int. Cl.$^6$ ............ A63B 21/02; B29C 49/04; B29C 47/88; B29C 71/00
[52] U.S. Cl. ............ 264/564; 264/150; 482/122; 482/124; 482/125
[58] Field of Search ............ 264/564, 150; 482/122, 124, 125

[56] References Cited

U.S. PATENT DOCUMENTS

| | | | |
|---|---|---|---|
| 3,674,733 | 7/1972 | Ayella | 260/30.6 |
| 3,837,773 | 9/1974 | Raley | 425/131 |
| 4,089,718 | 5/1978 | Triolo et al. | 156/122 |
| 4,326,708 | 4/1982 | Hinds . | |
| 4,570,929 | 2/1986 | Shoemaker | 272/137 |
| 4,839,227 | 6/1989 | Hoopman | 428/343 |
| 5,098,496 | 3/1992 | Breitigam et al. | 156/180 |
| 5,129,647 | 7/1992 | Castellanos . | |
| 5,169,464 | 12/1992 | Foldesy et al. | 156/73.3 |
| 5,202,065 | 4/1993 | Lenander et al. | 264/23 |
| 5,242,353 | 9/1993 | Cole et al. . | |

FOREIGN PATENT DOCUMENTS

| | | | |
|---|---|---|---|
| 0568083 | 11/1993 | European Pat. Off. . | |
| 0721834 | 7/1996 | European Pat. Off. . | |
| 2680977 | 5/1991 | France | 482/125 |
| 7112275 | 5/1972 | Netherlands . | |

OTHER PUBLICATIONS

Article appearing in *The New York Times* entitled "Rubber Gloves: Peril for Some", Wednesday, Jan. 29, 1997.
Processing guide entitled "KRATON™ Polymers Processing Guide".

*Primary Examiner*—Jan H. Silbaugh
*Assistant Examiner*—Michael Poe
*Attorney, Agent, or Firm*—Alston & Bird LLP

[57] ABSTRACT

A non-allergenic resistive exercise device is described. The device is in the form of a relatively thin elongate band of thermoplastic elastomer. In one embodiment of the invention, the device is in the form of a seamless endless band, while in another, the band is substantially strip-shaped. The bands can be textured to enhance the ability of a user to grip them during use, and the bands can also be printed or otherwise ornamented. The exercise devices of the instant invention are latex-free so as to be non-allergenic, do not require supplemental powdering of their surfaces, and are virtually odor-free. Several methods for producing the bands are also described. In one method, the thermoplastic elastomer material is extruded through an elongate-shaped die to form a cast film, which is solidified and cut to the desired length for use. In this method, the die in desirably substantially dog bone-shaped, in order to produce elongate bands having thickened side edges. In another method, the material is extruded as a hollow tube which is inflated with a gas and enlarged to form a large diameter tube having relatively thin walls. The tube is then cut transversely to form a plurality of seamless, substantially ring-shaped bands.

9 Claims, 2 Drawing Sheets

METHOD OF MAKING LATEX-FREE ELASTIC EXERCISE BANDS

BACKGROUND OF THE INVENTION

1. Field of the Invention

The invention generally relates to latex-free elastic exercise bands and methods of producing the same. More specifically, the invention relates to non-allergenic exercise bands made from a thermoplastic elastomer material.

2. Description of the Prior Art

Elastic exercise bands are commonly used as a means of providing resistance during exercise, such as during fitness classes and for physical therapy uses. Typically, the bands are stretched and released a number of times by the body part being worked; for example, a user may hold one end of a band stationary in one hand, while pulling the other band with his other hand, to work the muscles in his arm.

Commercially available elastic exercise bands are made from natural rubber latex, and are commonly provided in different resistance levels in order to provide the requisite resistance level desired for the particular exercise to be performed. The latex bands are commonly produced as a cast sheet or a calendered sheet which is then provided in finite lengths or in a continuous roll which can be cut to a desired length. Often, supplemental handles are provided with such bands in order that they can be more easily gripped for use in a specific exercise.

In recent times, however, it has become apparent that contact with latex products can cause an adverse reaction in many individuals. In fact, it has been found that approximately 17% of healthcare workers in North America have allergic reactions to natural latex. The reactions vary according to the individual and the duration and type of latex contact which occurs, with reactions varying from minor to very serious. In extreme cases, contact with natural latex has caused some individuals to enter into anaphylactic shock and for some, has even resulted in death. Thus, many people are required to avoid any contact with latex at all.

Such inability to contact latex products can be of particular disadvantage to healthcare professionals such as physical therapists, who in the normal course of their duties are often required to assist their patients in utilizing resistive exercise devices such as latex bands as part of their therapy process. Further, healthcare workers must be certain that their patients are not latex intolerant prior to instructing them to employ latex articles in their therapy, particularly since the skin pore opening which occurs from perspiration resulting from the exercise can render the patient more sensitive to the latex.

Other disadvantages associated with the conventional latex bands are that the surfaces of the latex bands have a tendency to stick to each other. To combat this tendency, the surfaces are typically powdered with talcum or an anti-tack powder during the production process. This powder can be irritating to the band users, particularly when it becomes airborne, and it tends to be messy, as it is easily transferred to the user's body and clothing. Furthermore, this powder on the surface of the latex can interfere with or inhibit ornamentation of the bands.

In addition, natural rubber latex has an unpleasant odor. In order to reduce the unpleasant smell, latex band manufacturers are generally forced to provide an odorant in the latex composition during the production process to mask the unpleasant natural odor. Despite the use of odorants, many individuals find the odor of the conventional latex exercise bands to be objectionable.

A further disadvantage of the latex exercise bands is that latex materials are not easily recyclable. Not only does this mean that disposal of the products is a problem, but waste produced during the production process must also be disposed of rather than being able to be reused in a subsequent operation. Such waste in the production process increases the cost of the bands as well as having an adverse environmental impact.

Thus, a need exists for an elastic exercise band product which provides desirable resistance characteristics, while eliminating the risk of allergic reactions. Further, a need exists for methods for efficiently making elastic exercise band products with only minimal waste.

SUMMARY OF THE INVENTION

With the foregoing in mind, it is therefore an object of the instant invention to produce a non-allergenic elastic exercise band device.

It is also an object of the present invention to provide an elastic exercise band product which can be readily manufactured with only minimal waste.

It is an additional object of the present invention to provide a powder-free exercise band device which is virtually odor free.

It is a further object of the invention to provide an elastic band device which can be readily grasped and retained by the user throughout a series of therapeutic exercises.

These and other objects are met through the provision of elastic exercise bands made from a thermoplastic elastomer material. While thermoplastic elastomers are known for various uses in other environments and as a replacement for certain synthetic rubber materials, they are not generally used as a substitute for latex due in part to the fact that articles made from thermoplastic elastomer cannot generally be manufactured by dipping or other conventional methods used to manufacture latex articles. In fact, such thermoplastic elastomer materials are usually used for the injection molding of soft rubbery types of articles.

The thermoplastic elastomers used to form the bands of the present invention desirably are capable of being extruded in the form of very thin films, particularly from about 0.1 mm to 1.25 mm thick. The thermoplastic elastomer also desirably has an elongation to break of about 300% to about 900%. In a preferred form of the invention, the thermoplastic elastomer also has a tensile strength of about 10 to about 30 MPa, and a modulus at 300% elongation of about 1 to 5 MPa. In a particularly preferred form of the invention, the thermoplastic elastomer is a styrene-butadiene-styrene block copolymer (SBS) or a styrene-ethylene/butylene-styrene block copolymer (SEBS) such as the type commonly available under the tradename KRATON®. Also useful in forming bands according to the instant invention are polyolefin elastomers such as the type sold under the tradename ENGAGE® by DuPont Dow Elastomers, L.L.C.

The elastic exercise bands of the instant invention can be provided in a variety of configurations. For example, in one embodiment of the invention, the bands may be in the form of thin, elongate strips of the thermoplastic elastomer material. In this embodiment of the invention, the strips can be provided from the manufacturer in the lengths desired for end use, or they can be provided as a continuous roll of strip-like material, from which a plurality of bands can be cut by the user to the desired length for a specific end use. In a preferred form of this embodiment, the side edges of the band are thickened, to provide added strength to the band, to improve grippability, and to provide the band with a more finished appearance.

In another embodiment of the invention, the bands are provided in a seamless, substantially ring-shaped form. In this embodiment, the bands can have any desired circumference, depending on the intended end use of the particular band. For example, the ring-shaped band can be made to have a relatively small circumference, where it can be used to exercise a user's hands. Alternatively, the bands can have a relatively large circumference, for use in the exercise of the arms or legs of a user. In any of the embodiments, one or more surfaces of the bands can also be textured to increase the ability for them to be grasped and retained by a user during the exercise. For example, the bands can be embossed during the production process, such that a predetermined pattern is formed on one or both of the band surfaces, or they can be chemically or otherwise treated to form a roughened or textured finish on one or both surfaces of the band.

The bands can be provided in a variety of thicknesses, with different thicknesses of band material providing different degrees of resistance. Alternatively, the composition of the thermoplastic elastomer material and/or the production parameters can be selected to produce bands of varying levels of resistance. Furthermore, coloring matter can be provided during band manufacture (as will be described more fully below), to produce colored bands. The bands of the instant invention can also be printed or otherwise patterned with informational or aesthetic ornamentation.

The elastic exercise bands of the instant invention can be made in several ways. In a first method, the thermoplastic elastomer material is extruded through a generally elongate die and immediately cast onto a large, cooled roller to lower its temperature, add strength, and to solidify the material in the form of an elongate continuous film. The cooled film can then be cut to the desired widths and lengths according to the manufacturer's preferences. For example, the material can be cut into the length desired for a finished exercise band or it can be provided as longer lengths, which can be cut by the user to form the desired finished band length. In some cases, it is also desirable to trim the side edges of the bands to provide them with a more finished appearance.

However, because the thermoplastic elastomer is extruded through a die, various die shapes can be selected in order to vary the shape of the finished exercise band, and to shape the side edges. For example, the opening in the die can be slightly or substantially dog bone-shaped, so as to form a flattened exercise band having thickened side edge portions. Alternatively, the band can have a constant thickness across its entire dimension.

The width and thickness of the bands produced using the cast film extrusion line can be varied in many ways, such as by adjusting the speed of the material leaving the extruder, altering the roll speed, and/or by selecting a particular die size and shape. In addition, color concentrate can be added to the melt stream in the extruder barrel to produce colored band products. If desired, the finished bands can be printed, embossed, or otherwise textured and/or ornamented in line with the extruder or in a separate operation. For example, the level of resistance or other information can be printed or embossed into the bands, a decorative pattern could be provided, etc. As will be recognized by those of ordinary skill in the art, such ornamentation can be functional or purely aesthetic.

In another embodiment of the invention, the bands are produced using a blown film line. In this method, a hollow tube of the thermoplastic elastomer material is extruded and filled with air or another gas as it leaves the extrusion die, so as to enlarge the diameter of the tube and to thin the tube walls. The result is a large, thin-walled tube of the thermoplastic elastomer material. The tube is cooled and solidified, then rolled up, preferably in the form of a lay-flat tube. The thus-flattened tube is then fed to a cutting device, which cuts the material transversely into endless bands of a desired width. In this way, a plurality of seamless, substantially ring-shaped exercise bands can be produced, which can be easily used in physical therapy activities without the need for supplemental handles or the like. For example, the circular bands can be slipped over a patient or exerciser's arms and/or legs, thereby obviating the need for them to grip the item at all.

Because the ring-shaped bands are seamless, there is no weak point along the band circumference which would have a tendency to fail during repeated use of the device. Thus, the bands of the instant invention are not only superior to their latex counterparts in that they are non-allergenic, they are also able to be provided in the above-described seamless ring-shaped configuration, which renders them particularly durable throughout repeated use. Furthermore, such continuous exercise loops can be cut open, either by the manufacturer or the user, to form one or more longitudinal exercise strips.

Non-sticking (i.e., non-blocking) additives can also be included in the thermoplastic elastomer material so that the bands do not have a tendency to stick together. Thus, unlike their latex counterparts, the bands of the instant invention do no require powdering. Furthermore, the thermoplastic elastomer materials are substantially odorless, and thus do not require the masking odorants required by the latex bands.

Because the thermoplastic elastomer material used in the instant invention is recyclable, any waste material produced during the process can be reground and reused in a subsequent production process, thereby minimizing waste. In addition, the bands can be recycled, if desired, following their use, in substantially the same manner.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
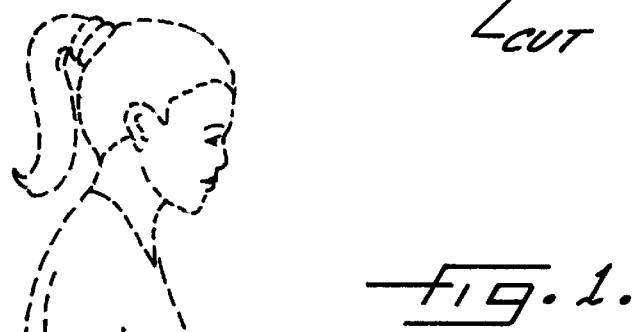
FIG. 1 is an environmental view of a person using an exercise band according to the instant invention.

With reference to the drawings, FIG. 1 is an illustration of an individual using an exercise band 10 of the instant invention as a means for providing resistance against forward motion of her foot F. In the particular exercise illustrated, the user grasps a free end 10a of the band in each of her hands in order to position a center region 10b of the band in front of her body. The effective length of the exercise band 10 (by virtue of its being of a particular length or it being grasped at particular positions along its length) is such that the band extends outwardly from the user's body to an extent which is less than the distance to the user's foot, such that when the user's foot is positioned against the band in the manner illustrated with the band in its unstretched condition, the user's leg must be bent. The user then straightens his or her leg against the resistance provided by the elastic band 10. The elasticity of the band 10 can be selected so as to provide the desired amount of resistance against the user's motions, as will be described further herein.

The elastic bands 10 according to the instant invention are made from a thermoplastic elastomer material, which preferably has a good degree of elasticity, an ability to be formed into thin sheet-like bands, and can undergo a number of stretchings, while repeatedly reassuming its original unstretched configuration upon release of the stretching force. As described above, such thermoplastic elastomer materials are non-allergenic; thus, an exercise band can be produced which overcomes the risks associated with the use of latex articles. In a preferred form of the invention, the tensile strength of the bands is about 10 to about 30 MPa, the elongation to break is about 300% to about 900%, and the modulus at 300% elongation is about 1 to about 5 MPa. Also in a preferred form of the invention, the bands have a thickness in the range of about 0.1 mm to about 1.25 mm, with bands being provided in varying thicknesses to provide varying degrees of resistance. In this way, a band can be preselected to provide a desired degree of resistance. Further, as will be recognized by those of ordinary skill in the art, other features such as processing parameters, material composition, and the like can be varied to achieve a desired level of resistance.

In a preferred form of the invention, the thermoplastic elastomer is selected from the group consisting of styrene-butadiene-styrene block copolymers, styrene-ethylene/butylene-styrene block copolymers, and mixtures thereof. Thermoplastic elastomers useful in forming the bands of the instant invention are commonly available under the tradename KRATON®. Such Kraton® polymers have a block copolymer structure consisting of three discrete polymer blocks of the A-B-A type. The end blocks (A) are a hard thermoplastic (polystyrene) while the center blocks (B) are elastomers. The polystyrene end blocks are hard and strong at room temperature, and lock the elastomer blocks in place to give a physically cross-linked network, which provides the polymers with their elastomeric properties. Upon heating of the material, the polystyrene softens such that the polymer can be shaped or molded, with the polymer material hardening upon cooling. As a result, the physical cross-linking of the Kraton® polymers is a reversible process, unlike vulcanization processes which are generally used to make latex and rubber articles. In another form of the invention, the bands are made from a polyolefin elastomer such as the type sold under the tradename ENGAGE® by DuPont Dow Elastomers, L.L.C.

The thermoplastic elastomer material also desirably includes conventional additives such as plasticizers, etc. to enhance in the extrudability of the material in amounts dependent on the thermoplastic elastomer material being used and the shape of articles being made, and readily determinable by those of ordinary skill in the art with routine experimentation. In a preferred form of the invention, the thermoplastic elastomer material also includes a non-sticking agent to reduce any tendency which the bands of extruded material might have to stick together. Particularly preferred as non-sticking agents are conventional microcrystalline waxes, which are known to those of ordinary skill in the art. In addition, small amounts of additives can be included in the thermoplastic material to enhance its durability and shelf-life, such as anti-oxidizers and UV inhibitors. Generally, the thermoplastic elastomer material constitutes at least about 95% of the overall band material.

Figure 2:
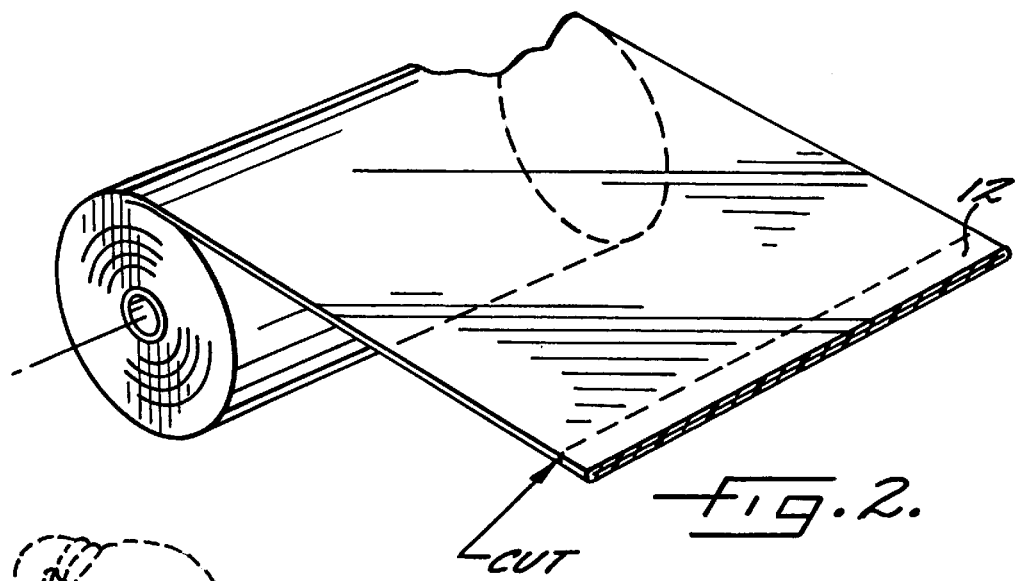
FIG. 2 illustrates a roll of material made using a blown-film line to produce a continuous lay-flat tube, and illustrating how the roll of lay-flat tube can be cut to form an exercise band according to the instant invention.
Figure 3:
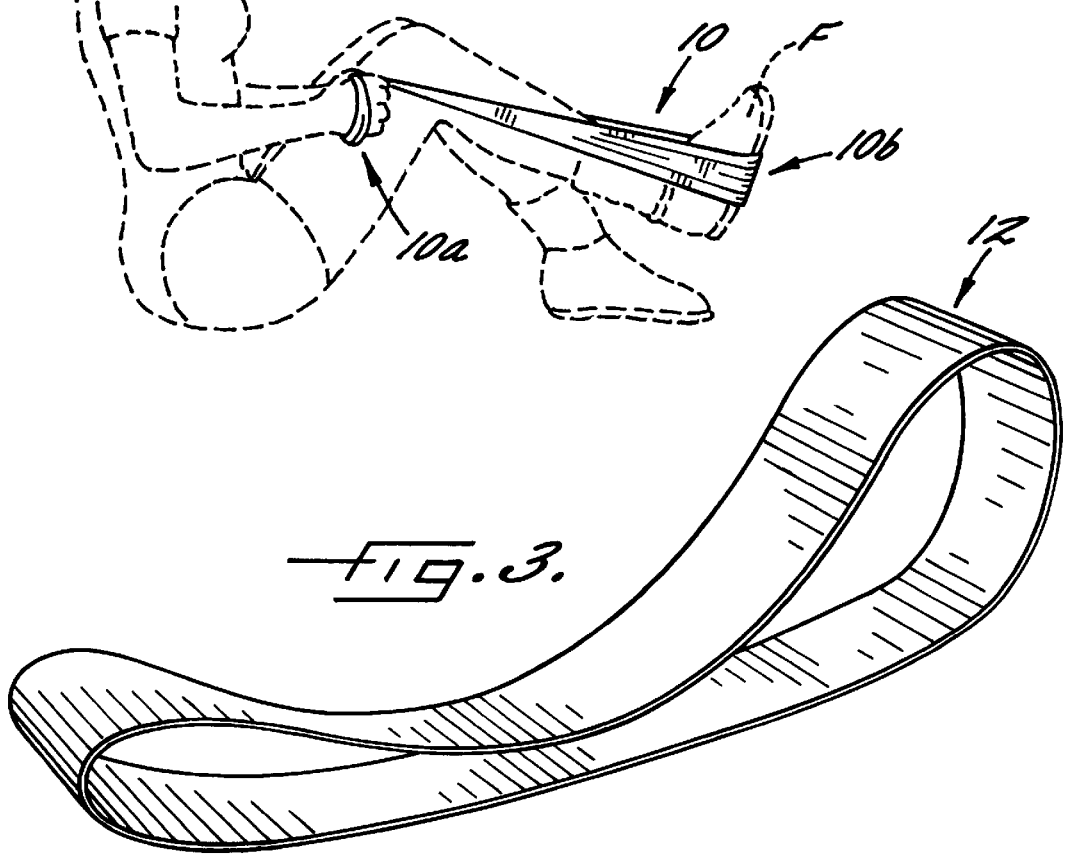
FIG. 3 is an exercise band according to the instant invention made in the form of an endless band.

FIGS. 2 and 3 illustrate a first embodiment of the invention, which is elastic band 12 having a seamless substantially ring-shaped configuration. The band 12 can be provided to have any desired diameter, and to have any desired band width and thickness. In a preferred form of the invention, such bands have a width from about 10 mm to 300 mm; particularly preferred are widths between about 50 mm and 200 mm. Particularly preferred are bands having a lay flat length of about 100 mm to about 1,000 mm and particularly about 250 mm to 750 mm. In other words, the circumference of such bands would be from about 200 mm to 2,000 mm and particularly about 500 mm to 1,500 mm. As described above, such bands would also desirably have a thickness from about 0.1 mm to about 1.25 mm. It is to be noted, however, that these dimensional parameters are exemplary of those preferred, although others are seen to be within the scope of the invention.

The method of making this band 12 will be described with reference to FIG. 2. The method involves producing a hollow tube of thermoplastic elastomer material on a blown film line, similar to those commonly used to make articles such as plastic bags. In this method, a flowable thermoplastic elastomer material is extruded through a substantially ring-shaped die orifice to form a tube-shaped film, then the film tube is filled with air or another gas as it leaves the extrusion die so as to enlarge the circumference of the tube and thin the material forming its walls. As a result, a large thin-walled tube of thermoplastic elastomer material is produced. In a preferred method of the invention, the thermoplastic elastomer material is extruded through a 6 inch diameter substantially ring-shaped orifice, then expanded to form a tube having a circumference between about 200 and about 2000 mm.

The tube is then solidified, typically by cooling, and taken up. In a preferred method of the invention, the tube is rolled up in the form of a lay flat tube.

The thus-flattened tube is then desirably fed to a cutting device, where the flat tube of material is cut transversely into bands of a predetermined width. In this way, a plurality of seamless, substantially ring-shaped band structures can be produced easily and efficiently. The substantially ring-shaped exercise band can then be used as is, or it can be cut open to form a substantially strip-shaped elastic band. As will be recognized by those of ordinary skill in the art, this production method provides a unique axial orientation to the thermoplastic elastomer material of the bands, which in turn has been found to provide unique durability and elasticity characteristics to the exercise bands.

Figure 4:
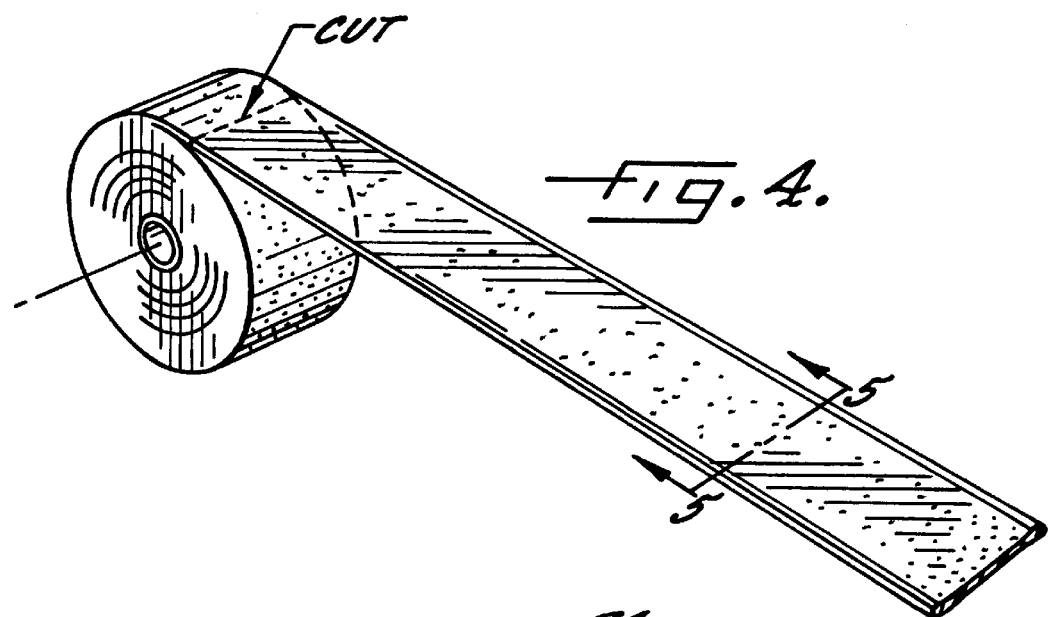
FIG. 4 is a perspective view of a roll of material made using an extruded film method, and illustrating how the material can be cut to form individual exercise bands.
Figure 5:
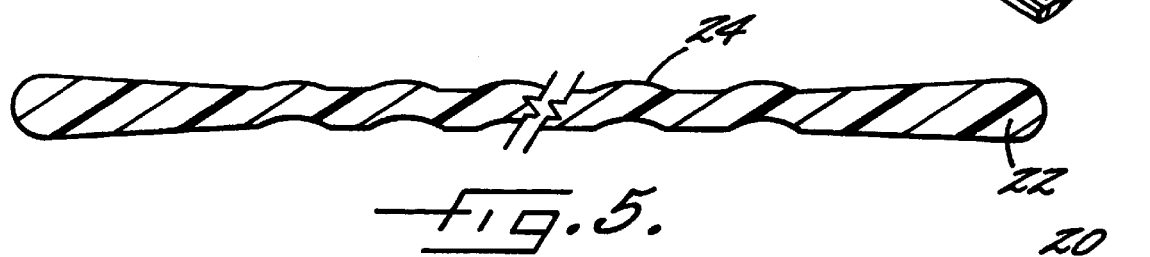
FIG. 5 is a cross-sectional view taken along line 5—5 of FIG. 4, illustrating a band construction which has been textured to form an easily grippable product.
Figure 6:
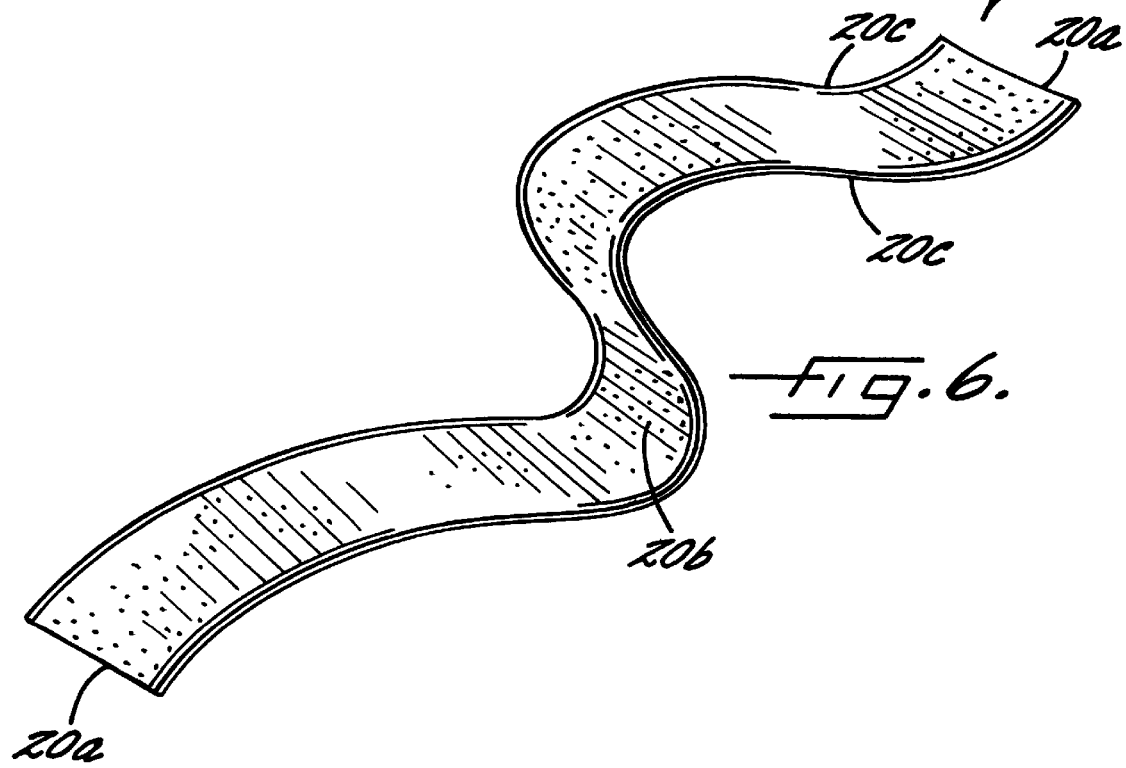
FIG. 6 is a perspective view of a substantially rectangular exercise band according to the instant invention.

FIGS. 4–6 illustrate an alternative embodiment of the invention. In this embodiment, the exercise band 20 is substantially strip-shaped. Like the band 10 illustrated in FIG. 1, the band 20 desirably includes first and second end portions 20a, a central portion 20b, and first and second side edges 20c. In a preferred form of this embodiment, the side edges 20c of the elastic band 20 are thickened, as shown at 22. These thickened portions 22 give a more finished look and feel to the elastic band product, increase its durability, and enhance its grippability. Although illustrated as being somewhat rounded, it is noted that the thickened portions 22 can be of any desired shape or configuration. These thickened portions are desirably about two to three times as thick as central portions of the band, e.g., about 0.2 mm to about 3.75 mm thick on bands having a thickness between about 0.1 mm and 1.25 mm.

Also in a preferred form of the invention, one or both surfaces of the elastic band 20 are textured, such as by embossing them using a textured plate. Such texturing can be purely functional (i.e., to provide a more grippable surface) or the texturing can also serve informational and/or aesthetic purposes. For example, the band 20 could be embossed or printed with indicia indicating the number of pounds of resistance which it provides, measurements advising a user as to the length of the band (i.e., tick marks indicating inches, etc.), and the like. In the illustrated embodiment, the texturing is in the form of a plurality of dimples 24 along the upper and lower surfaces of the band. However, it is to be noted that other configurations and types of texturing can be provided within the scope of the invention. For example, the band could be chemically treated or coated to enhance its grippability.

The elastic exercise bands 20 of this embodiment are preferably made using an extruded film line. Equipment useful for forming these bands is manufactured by Killian Extruders, Inc. under the name KN Series Extruders. In this method, the thermoplastic elastomer material is extruded through a die and cast onto a large cooled roller where the temperature of the elastomer material is lowered and strength and solidity are added to the material. In this way, a continuous length of material is produced. In a preferred method of the invention, the die is generally elongate in shape, so as to form a substantially strip-shaped length of thermoplastic elastomer material. In a particularly preferred method, a flex-lip die is utilized which enables the die slot thickness to be readily and easily varied according to manufacturing preferences. Such dies are known in the art, and have a flexible top portion which can be flexed to vary the thickness of the die slot, to thereby vary the thickness of material extruded.

In one form of the method, the die used to extrude the thermoplastic elastomer material has a slightly or substantially dog-bone shape so as to form a flattened exercise band having thickened side edge portions. As described above, the thickened side edge portions provide additional durability and a more finished appearance to the bands.

The cooled length of thermoplastic elastomer material can at this time be cut to the desired length desired for the finished band or it can be rolled into large rolls of material which can be subsequently cut to the desired finished length. Alternatively, the lengths of material can be provided to a user in the form of a roll from which the user can cut to the length desired for his particular use.

The manufacturing parameters such as the speed of the material leaving the extruder, the roll speed, the die size and shape, etc. can be adjusted to achieve the desired band dimensions and resistance levels. In a preferred form of the invention, the bands are from about 50 mm to about 150 mm wide and about 0.1 mm to about 1.25 mm thick. As described above, the thickness of the bands can be selected to provide varying resistances to the bands such that a variety of finished bands may be provided from which the user can select the desired degree of resistance. Typical pre-cut lengths of the elastic bands are from about 100 mm up to about 1500 mm depending on the body part for which the band will be used to exercise.

Also in a preferred form of the invention, the texturing is performed using a conventional type embossing method. For example, an embossed roller having a plurality of dimples thereon can be caused to contact the thermoplastic elastomer material as it is being cooled following extrusion such that the cooled material includes the dimpled shape of the plate. Alternatively, a heated embossing plate could be used to contact the already solidified thermoplastic elastomer material, to provide it with a textured effect. However, it is noted that other types of methods conventionally used to emboss or texture similar types of materials can be used. In addition, rather than being textured along the full length and/or width of the bands, the elastic bands could be embossed at particular spaced locations using a shaped brand or the like. For example, the elastic bands could be embossed with the logo of the manufacturing company, an indication of the resistance level of the band, or the like. In addition, the bands can be printed with either ornamental indicia or with indicia indicating the source of the bands and/or the resistance they provide.

Because the thermoplastic elastomer material is readily recyclable in any of the methods described above, any waste elastomer material can be reground and reprocessed in a subsequent operation. As a result, waste is minimized as are disposal expenses.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of making an exercise device comprising the steps of extruding a flowable material including at least about 95% of a thermoplastic elastomer through a hollow orifice to form a tube of thermoplastic elastomer having a hollow center;

expanding the circumference of the tube to a circumference of abut 200 mm to about 2000 mm and a thickness of about 0.1 mm to about 1.25 mm by filling it with a gas;

cooling the tube to solidify the thermoplastic elastomer, the solidified tube having an elongation to break of about 300% to about 900%, a tensile strength of about 10 MPa to about 30 MPa, and a modulus at 300% elongation of about 1 MPa to about 5 MPa and cutting the solidified tube into a plurality of substantially ring-shaped endless bands having an end to and width which is less than a diameter of said tube, said width of each band being about 10 mm to about 300 mm, to thereby form a resistive exercise device.

2. A method according to claim 1, wherein said step of extruding a flowable thermoplastic elastomer material comprises extruding a thermoplastic elastomer material selected from the group consisting of styrene-butadiene-styrene block copolymers, styrene-ethylene/butylene-styrene block copolymers, polyolefin elastomers and mixtures thereof.

3. A method of making an exercise device comprising the steps of:

extruding a flowable material including at least about 95% of a thermoplastic elastomer material through a die to form a thin thermoplastic elastomer material stream;

cooling the stream to form a solidified film having a thickness of about 0.1 mm to 1.25 mm, an elongation to break of about 300% to about 900%, a tensile strength of about 10 MPa to about 30 MPa, and a modulus at 300% elongation of about 1 MPa to about 5 MPa, and cutting the film into a band having a width which is less than a lay flat length thereof, said width being about 10 mm to about 300 mm and said lay flat length being about 100 mm to about 1500 mm, to thereby form a resistive exercise device.

4. A method according to claim 3, wherein said step of extruding a flowable thermoplastic elastomer material comprises extruding a thermoplastic elastomer material selected from the group consisting of styrene-butadiene-styrene block copolymers, styrene-ethylene/butylene-styrene block copolymers, polyolefin elastomers, and mixtures thereof.

5. A method according to claim 3, wherein said step of extruding a flowable thermoplastic elastomer material through a die comprises extruding the material through a slightly dog bone-shaped orifice, to thereby form an elongate band having thickened side edges.

6. A method according to claim 3, further comprising the step of texturing at least one of the surfaces of the film, to improve the grippability of the exercise devices.

7. A method according to claim 3, wherein said step of extruding the flowable thermoplastic material comprises extruding the material through a hollow orifice to form a tube-shaped film of material, and said cutting step comprises cutting the tube-shaped film to form a plurality of seamless substantially ring-shaped bands.

8. A method according to claim 1, further comprising the step of texturing at least one surface of the tube to thereby improve the grippability of the bands.

9. A method according to claim 8, wherein said step of texturing at least one surface of the tube comprises embossing the tube with a textured plate.

* * * * *

UNITED STATES PATENT AND TRADEMARK OFFICE
CERTIFICATE OF CORRECTION

PATENT NO. : 5,945,060
DATED : August 31, 1999
INVENTOR(S) : Williams

It is certified that error appears in the above-identified patent and that said Letters Patent is hereby corrected as shown below:

Title page, item [57], Abstract, line 15, "in" should read --is--.
Column 8, line 59, after "MPa" insert a comma(,)--(2nd occurrence) and line 61, "and" should read --end--.

Column 9, line 10, before "1.25 mm" insert --about--.

Signed and Sealed this

Twenty-second Day of August, 2000

Attest:

Q. TODD DICKINSON

*Attesting Officer*     *Director of Patents and Trademarks*